(12) United States Patent
Pawlowski

(10) Patent No.: US 6,189,073 B1
(45) Date of Patent: *Feb. 13, 2001

(54) METHOD OF EMULATING A DUAL-PORT MEMORY DEVICE USING AN INTERNALLY CACHED STATIC RANDOM ACCESS MEMORY ARCHITECTURE

(75) Inventor: J. Thomas Pawlowski, Boise, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/139,928

(22) Filed: Aug. 26, 1998

Related U.S. Application Data

(62) Division of application No. 08/560,101, filed on Nov. 17, 1995, now Pat. No. 5,835,941.

(51) Int. Cl.[7] ............................. G06F 9/28; G06F 13/16
(52) U.S. Cl. ....................... 711/120; 711/119; 711/168; 711/149
(58) Field of Search .................................... 711/127, 120, 711/149, 211, 202, 221, 119, 123, 168; 395/800.35

(56) References Cited

U.S. PATENT DOCUMENTS

| | | | |
|---|---|---|---|
| 4,724,518 * | 2/1988 | Steps ................................. | 711/127 |
| 4,733,352 * | 3/1988 | Nakamura et al. ............... | 711/152 |
| 5,130,922 * | 7/1992 | Liu .................................... | 711/144 |
| 5,265,235 * | 11/1993 | Sindhu et al. .................... | 711/120 |
| 5,287,484 * | 2/1994 | Nishii et al. ...................... | 711/144 |
| 5,289,588 * | 2/1994 | Song et al. ........................ | 711/120 |
| 5,317,716 * | 5/1994 | Liu .................................... | 711/144 |
| 5,329,633 | 7/1994 | Lee et al. . | |
| 5,437,022 * | 7/1995 | Beardsley et al. ................. | 714/6 |
| 5,477,445 * | 12/1995 | Weber ............................... | 364/188 |
| 5,669,009 * | 9/1997 | Buktenica et al. ................ | 712/35 |
| 5,689,680 * | 11/1997 | Whittaker et al. ................ | 711/127 |
| 5,802,561 * | 9/1998 | Fava et al. ........................ | 711/120 |
| 5,809,536 * | 9/1998 | Young et al. ..................... | 711/144 |
| 5,893,143 * | 4/1999 | Tanaka et al. .................... | 711/120 |

* cited by examiner

Primary Examiner—B. James Peikari
(74) Attorney, Agent, or Firm—Thorp Reed & Armstrong

(57) ABSTRACT

A circuit for internally caching a memory device having a main memory is comprised of a cache memory of smaller size than the main memory for storing certain of the same data stored in the main memory. A tag memory is provided for mapping the information stored in the cache memory. A logic circuit is in communication with the main memory, the cache memory, and the tag memory for controlling the input of data thereto and output of data therefrom. The cache memory, tag memory, and logic circuit are carried internally in the memory device.

22 Claims, 2 Drawing Sheets

METHOD OF EMULATING A DUAL-PORT MEMORY DEVICE USING AN INTERNALLY CACHED STATIC RANDOM ACCESS MEMORY ARCHITECTURE

This application is a divisional of prior U.S. application Ser. No. 08/560,101 filed Nov. 17, 1995, now U.S. Pat. No. 5,835,941

BACKGROUND OF THE INVENTION

1. Field of the Invention

The present invention is directed generally to hierarchical cache memory structures.

2. Description of the Background

In a computer, the central processing unit (CPU) executes instructions at a predetermined rate. To obtain the instructions to be executed, or the data which is to be manipulated, the CPU must access a memory which contains the necessary instructions and data. Such memory is typically one of two types. A static random access memory (SRAM) is characterized by operation in one of two mutually-exclusive and self-maintaining states. Each static memory cell typically has an output which reflects a "high" voltage or "low" voltage representative of a logic level "1" or a logic level "0", respectively.

Another type of memory is the dynamic random access memory (DRAM) which does not have stable states of operation. A DRAM, like an SRAM, can be programmed to store a voltage which represents a logic level "1" or a logic level "0" but requires periodic refreshing to maintain those logic levels for more than a very short period of time. Despite that limitation, DRAMs are frequently used because of the significantly greater packing density which can be obtained, and because of the substantially lower cost associated therewith. Thus, in a computer, it is not unusual to find that the large main memory is comprised of DRAMs.

Because a CPU operating in conjunction with a main memory constructed of DRAMs will operate at a substantially faster speed than such a main memory, a smaller cache memory, typically constructed of SRAMs, is often used to buffer the data and the instructions between the main memory and the CPU. The cache memory is typically managed under hardware control and maintains a copy of certain portions of the information found in the main memory. The information maintained in the cache memory are those instructions and data which the CPU is likely to use. Thus, because the CPU can often find the instructions and data needed in the faster cache memory, the speed at which the CPU can operate is no longer limited to the access time of the main memory.

Despite the use of SRAM cache memory, CPU's still operate faster than instructions and data can be provided thereto. Recently, CPU's have been introduced that have execution cycle times under five nanoseconds, which is below the access time of typical SRAMs. To enable such fast CPU's to operate more efficiently, "on-chip" cache memories provide an additional level of cache memory between the processor and the external SRAM cache memory. The use of such on-board cache memory creates a hierarchical situation between the on-board cache memory and the external cache memory. That hierarchical arrangement allows the CPU to operate more quickly because the data and instructions required by the CPU are likely to be found in one of the cache memories. However, the need still exists to provide memory devices which have faster access times so that external cache memory constructed of SRAMs may allow CPU's to operate as close as possible to their limits.

SUMMARY OF THE INVENTION

The present invention, in its broadest form, is directed to a circuit for internally caching a memory device having a main memory. The circuit is comprised of a cache memory of smaller size than the main memory for storing certain portions of the same data stored in the main memory. A tag memory is provided for mapping the information stored in the cache memory. A logic circuit is in communication with the main memory, the cache memory, and the tag memory for controlling the input of data thereto and output of data therefrom. The cache memory, tag memory, and logic circuit are carried internally in the memory device.

The present invention solves the problem of improving the performance of SRAMs by providing an internally cached SRAM circuit comprised of a main static random access memory array for storing data. A cache static random access memory array of smaller size than the main array is provided for storing certain of the same data that is stored in the main memory. A tag static random access memory array for mapping the information stored in the cache memory is also provided. A logic circuit is in communication with the main memory, the cache memory, and the tag memory for interrogating the tag memory in response to a request for data. The logic circuit retrieves the requested data from either the main memory or the cache memory in response to the results of the interrogation. The logic circuit also inputs the retrieved data to the cache memory while updating the tag memory if the retrieved data is found only in the main memory. Finally, the logic circuit inputs data to both the main memory and the cache memory while updating the tag memory in the event new data is to be stored.

The foregoing cached memory device results in an SRAM with improved performance because the smaller cache memory can respond more quickly than the larger main memory, even though both memory arrays are constructed of static cells. That is because, among other factors, a smaller SRAM has less internal capacitance to overcome and therefore can be read more quickly.

Another aspect of the present invention is that the aforementioned architecture can be used to enable a single-port SRAM to emulate a dual-port device. To implement such an embodiment, a second cache static random access memory array, a second tag static random access memory array, and a second logic circuit in communication with the second cache memory and the second tag memory, are provided. Multiplexers are responsive to one of the logic circuit and the second logic circuit for accessing an input port of the main memory. In that manner, access times are again improved. Furthermore, that concept can be applied to implement more than two ports of access. Those and other advantages and benefits of the present invention will become apparent from the Description Of The Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
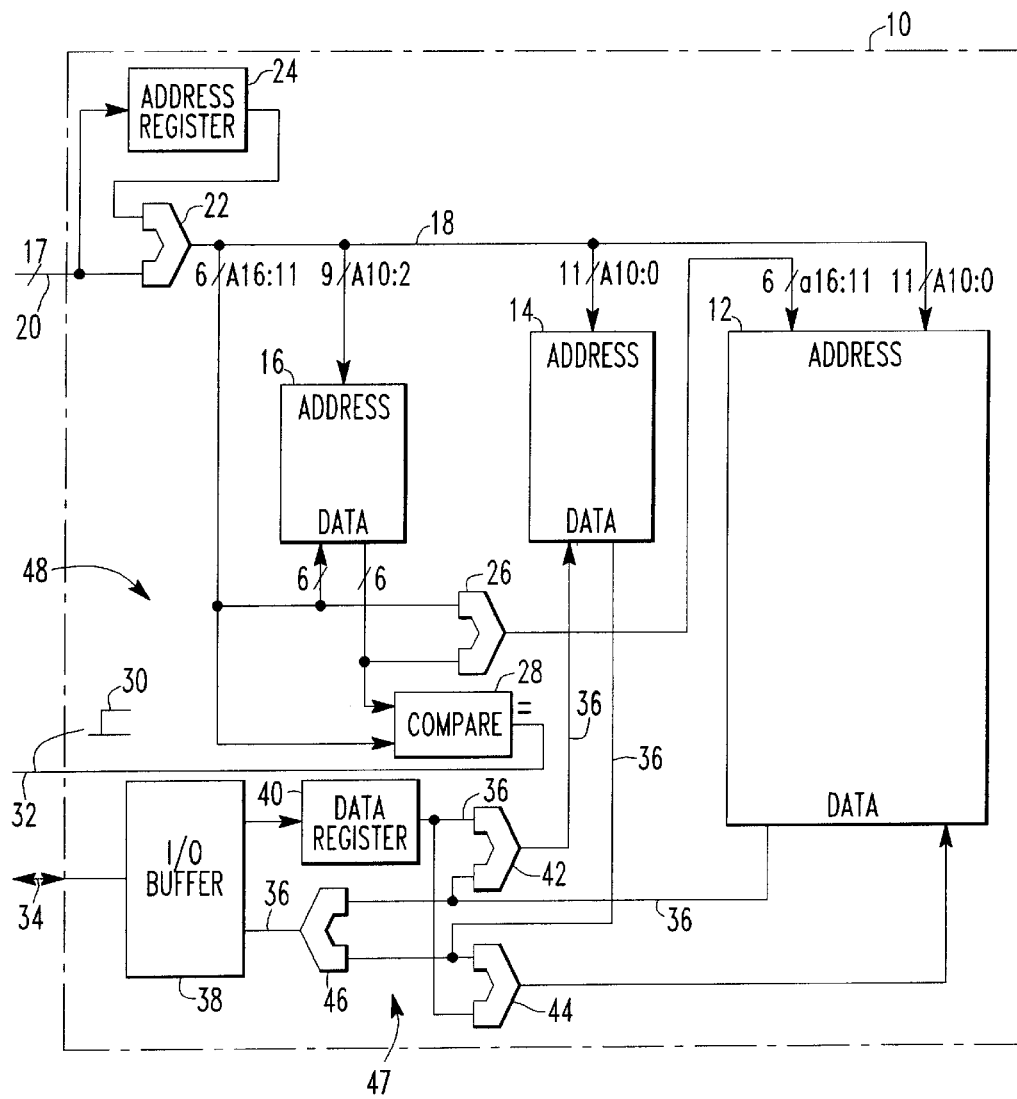
FIG. 1 is a simplified block diagram illustrating an internally cached static random access memory circuit constructed according to the teachings of the present invention.

FIG. 1 is a simplified block diagram illustrating an internally cached, static random access memory device or circuit 10 constructed according to the teachings of the present invention. It is to be understood that the circuit 10 illustrated in FIG. 1 has been simplified to illustrate only those aspects of the circuit 10 relevant to the present invention while eliminating, for purpose of clarity, many of the elements found in a typical SRAM circuit. Those of ordinary skill in the art will recognize that other elements, such as sense amps, decoders, and the like are required to produce an operational SRAM. However, because such elements are well known in the art, and because they do not relate to the architecture which is the subject of the present invention, a discussion of such elements is not provided herein.

The internally cached SRAM 10 illustrated in FIG. 1 is intended to be implemented on a single chip. Thus, the internally cached SRAM 10 illustrated in FIG. 1 could be used to provide an external SRAM cache of the type described hereinabove in the Description of the Background.

The internally cached SRAM 10 is comprised of a main static random access memory array 12 providing the primary data storage area. A cache static random access memory array 14 is provided, which is of a smaller size than main memory 12, for storing certain of the same data as is stored in main memory 12. Because cache data memory 14 is also implemented through static random access memory arrays as is main memory 12, its smaller size allows it to operate faster than main memory 12. The smaller the size of cache data memory 14 with respect to main memory 12, the greater the disparity in access times between the two memories. Finally, a tag static random access memory array 16 is also provided for tracking or mapping the information stored in cache data memory 14.

Main memory 12, cache data memory 14, and tag memory 16 are interconnected by an internal address bus 18. The internal address bus 18 is connected to an external address bus 20 through a 2:1 multiplexer 22. The multiplexer 22 also receives input from an address register 24 which is responsive to the external address bus 20. The combination of register 24 and multiplexer 22 acts as an input flow-through register, allowing the address to be utilized as early as possible. The external address bus 20 and internal address bus 18 have been illustrated in FIG. 1 as containing 17 lines. The presentation of an example wherein the address buses contain 17 lines is for purposes of illustration and not limitation. The address bus 18 carries address information which may be divided into an index field comprised of lines 0–10 and a tag field comprised of lines 11–16. The index field is input to the address terminals of memory 12 from the bus 18. The tag field is input to the address terminals of memory 12 through a multiplexer 26. The multiplexer 26 also receives a tag field output from the data output terminals of tag memory 16.

The index field is input directly to the address terminals of cache data memory 14. Nine lines, lines 2–10, are input to the address terminals of tag memory from the data bus 18. A comparator 28 also receives a tag field from the internal address bus 18 and a tag field output from the data output terminals of tag memory 16.

In operation, certain portions of the data stored in main memory 12 are also stored in cache data memory 14. As is known in the art, the tag memory 16 is provide to map the relationship between the information stored in the cache data memory 14 and the main memory 12. In effect, the tag memory 16 keeps track of the information stored in the cache data memory 14. Those of ordinary skill in the art will recognize that the separate tag memory 16 may be eliminated in circumstances where the tag field is stored with the data in cache data memory 14.

To retrieve information from main memory 12, the entire seventeen bit address, i.e. the tag field and the index field, must be input to main memory 12. In contrast, the cache data memory 14 only requires that the index field be input thereto. In response to a request for data, the tag memory 16 is interrogated to determine if the requested data is in the cache data memory 14. If so, a tag field output from tag memory 16 will be the same as the tag field of the address of the requested information such that a comparator 28, responsive to both those tag fields, produces a ready signal 30 available on a line 32. The ready signal 30 indicates to the processor that the data is in the cache data memory 14 such that a fast external bus access may occur.

An external data bus 34 is connected through an input/output buffer 38 to a data register 40. Output terminals of the register 40 are connected through an internal data bus 36, through a multiplexer 42, to the data input terminals of cache data memory 14. The output terminals of the data register 40 are also connected to the data input terminals 43 of main memory 12 through a multiplexer 44 via internal data bus 36. Optionally, an output register may be present between buffer 38 and multiplexer 46. The data output terminals of cache data memory 14 are connected through the data bus 36 to the input terminals of the multiplexer 44 and to the input terminals of a multiplexer 46. The data output terminals of main memory 12 are also connected to the input terminals of the multiplexer 46 through internal data bus 36. The output terminals of multiplexer 46 are connected to the input/output buffer 38 through the internal data bus 36.

It should be noted that the internal data bus 36 need not be the same width as the width of the external data bus 34. The internal data bus could be wider than the external data bus to enable data to be moved in blocks of four, for example, between main memory 12 and cache data memory 14. The transfer size is an integer multiple of the external data bus width and may be adjusted for the specific depth/width of the main memory 12. Providing a larger internal data bus 36 increases the overall speed of operation of device 10.

The input/output buffer 38, data register 40, comparator 28, address register 24, and associated multiplexers and bus interconnections form a logic circuit generally denoted 47. The logic circuit 47 together with cache data memory 14 and tag memory 16 form a circuit 48 which is used to provide an internal cache for memory device 10.

In operation when the ready signal 30 indicates that the requested data may be retrieved from cache data memory 14, the appropriate data is output on internal data bus 36 through multiplexer 46 to input/output buffer 38. If the ready signal does not go high, indicating a miss, than the requested data must be retrieved from main memory 12. A miss results in a temporary busy indication until the requested information can be accessed. That can be accomplished because main memory 12 has been provided with both the tag field and the index field. In that case the requested data is retrieved from main memory 12 and output on data bus 36 to multiplexer 46 and multiplexer 42. Multiplexer 46 outputs the retrieved data to the input/output buffer 38 while the multiplexer 42 inputs the retrieved data to cache data memory 14. While the retrieved information is being stored in cache data memory 14, the tag field associated with the retrieved data is input to the data input terminals of tag memory 16 such that tag memory 16 is updated. Because of that operation, if that same data should again be requested, it will now be found in cache data memory 14.

It is also necessary to write data to main memory 12. The logic circuit 47 supporting memories 12, 14, and 16 provides for information to be stored simultaneously in main memory 12 and cache data memory 14. That is seen as information is output from data register 40, it is input through multiplexer 42 to the data input terminals of cache data memory 14 at the same time that it is input to the data input terminals of main memory 12 through multiplexer 44. While the data is being stored in main memory 12 and in cache data memory 14, tag memory 16 is updated so as to store the tag field associated with data being stored in the main memory 12 and cache data memory 14. Thus, the architecture illustrated in FIG. 1 allows for a fast static random access memory 10 to operate even faster by providing it with a cache static random access memory array 14 that holds the data that is being accessed most often.

For purposes of illustration and not limitation, the following three examples are provided to illustrate sizes for main memory 12, cache data memory 14, and tag memory 16. To improve upon hit rates in the cache data memory 14, the tag memory 16 may optionally be organized as multiple sets to implement a multi-way cache memory. That would entail extra status bits beyond the dirty bit shown in the examples.

| Example 1 | |
|---|---|
| Tag Memory: | 4K × 3 + 1 SRAM (3 compare, 1 dirty) |
| Cache Memory: | 16K × 32 SRAM |
| | cache line length = 4 × 32 bits |
| Main Memory: | 128K × 32 SRAM |
| Example 2 | |
| Tag Memory: | 4K × 5 + 1 SRAM (5 compare, 1 dirty) |
| Cache Memory: | 16K × 32 SRAM |
| | cache line length = 4 × 32 bits |
| Main Memory: | 512K × 32 SRAM |
| Example 3 | |
| Tag Memory: | 32K × 2 + 1 SRAM (2 compare, 1 dirty) |
| Cache Memory: | 128K × 32 SRAM |
| | cache line length = 4 × 32 bits |
| Main Memory: | 512K × 32 SRAM |

Figure 2:
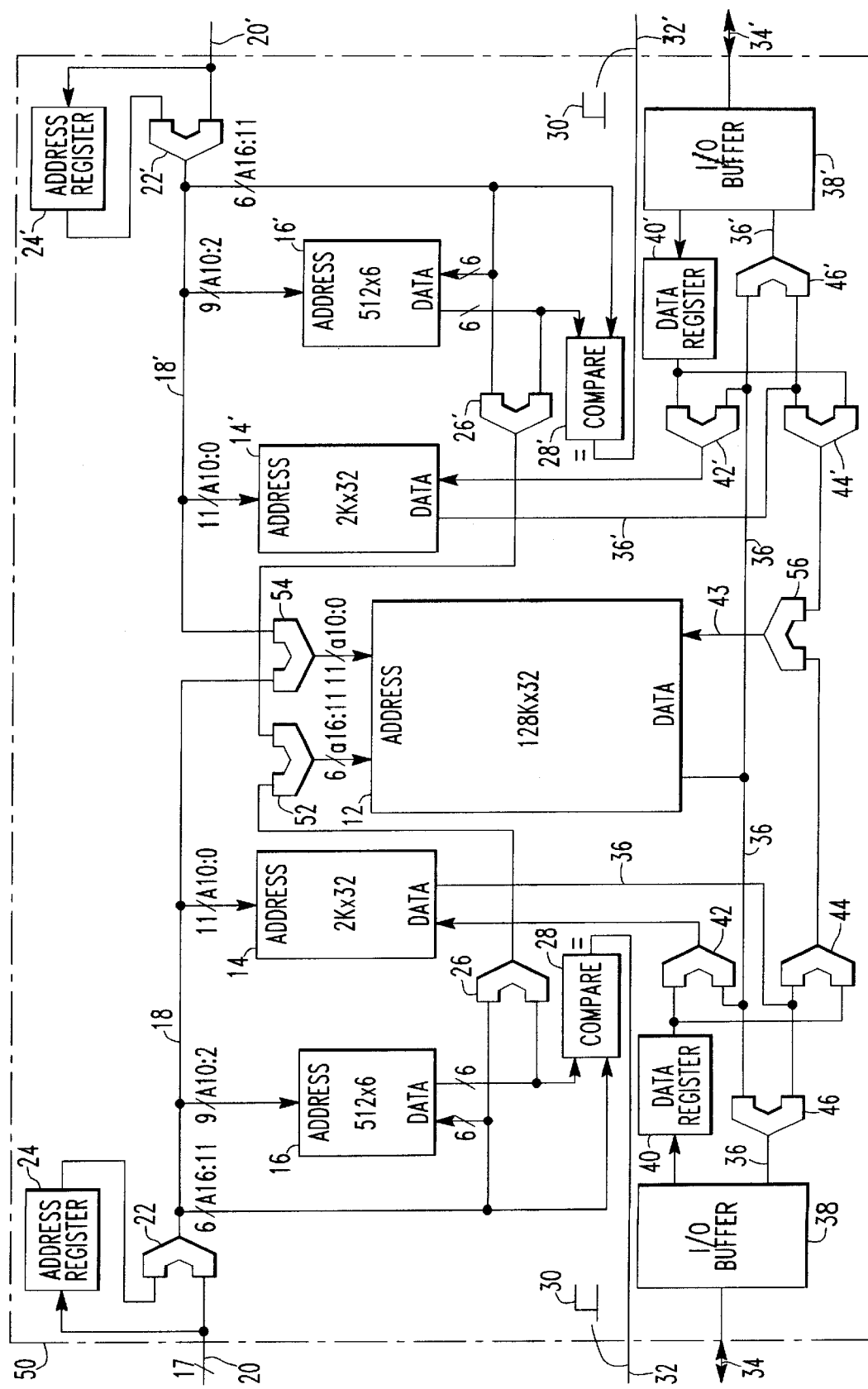
FIG. 2 is a simplified block diagram illustrating how the circuit of the present invention for internally caching a static random access memory may be used to enable a single-port memory device to emulate a dual-port memory device.

FIG. 2 is a simplified block diagram illustrating how the circuit 48 of the present invention may be used to enable a single-port main memory array to emulate a dual-port device. An internally cached SRAM 50 illustrated in FIG. 2 operates as a dual-port device although the device 50 is constructed around the same single-port main memory 12 as illustrated in FIG. 1. In fact, all the elements appearing in the left portion of FIG. 2 are the same as those appearing in FIG. 1, so those elements have been provided with the same reference numerals. To enable the single-port main memory 12 to function as a dual-port memory, a second cache static random access memory array 14' and a second tag static random access memory array 16' are provided which are inter-connected by internal address bus 18'. Cache data memory 14' and tag memory 16' are provided with supporting logic circuitry of the same type discussed hereinabove in conjunction with FIG. 1 which is illustrated by use of the "prime" designation in conjunction with the reference numerals. In operation, the right portion of the architecture shown in FIG. 2 operates the same as the left portion of the architecture shown in FIG. 2, which operates the same as the architecture illustrated in FIG. 1.

To enable the memory 12 to operate so that the device 50 emulates a dual-port device, three additional multiplexers are provided. Multiplexer 52 receives a tag field from multiplexer 26 and a tag field from multiplexer 26'. A multiplexer 54 receives an index field from internal address bus 18 and another index field from internal address bus 18'. The logic gates 52 and 54 are connected to the address terminals of main memory 12.

On the data side, the data output terminals of main memory 12 are connected to the multiplexers 46, 46', 42, and 42'. The data input terminals 43 of main memory 12 are connected through a multiplexer 56 to the output terminals of multiplexer 44 and the output terminals of multiplexer 44'. In that manner, the information into and out of main memory 12 is controlled by the supporting logic circuit in the left portion of FIG. 2 and the supporting logic circuit in the right portion of FIG. 2 through the operation of multiplexers 52, 54, and 56. If one port requires data, but the desired main SRAM location is busy interacting with another port, a wait condition is indicated at the port which is experiencing the delay.

The circuit architecture illustrated in FIG. 2 is an extension of the circuit architecture illustrated in FIG. 1. The data bandwidth of SRAM 50 is greater than the data bandwidth of SRAM 10. In other words, the average access time for SRAM 50 is less than the average access time for SRAM 10 because of the ability to retrieve data from cache data memory 14 and cache data memory 14', or from cache data memory 14 and main memory 12, or from cache data memory 14' and main memory 12. Thus, the overall performance of the SRAM 50 embodying the architecture illustrated in FIG. 2 is an improvement over the SRAM 10.

True dual-port SRAMs need more transistors per cell than a conventional single-port device, at least two extra. That results in a very large die size to support the SRAM. Also, true dual-port SRAMs become much slower as the size is increased. The architecture of the present invention dramatically reduces the speed degradation when the SRAM size is increased and reduces the die area needed to implement the device because the main memory 12 will retain a more conventional SRAM cell configuration. Also, the architecture of the present invention facilitates more than two ports of access because as many ports as desired may be added using one extra small cache per port. Such multiple port SRAMs have applications in graphics systems, multiprocessor systems, and communications applications such as asynchronous transfer mode (ATM).

The cache sizes for each port may, but need not be, identical. For example, if one port is connected to a graphics controller, a second port is connected to a display driver, and a third port is connected to a microprocessor, the graphics controller may operate more efficiently with a larger cache memory than required by the other devices. Each port's cache may have different sizes and hence would have different tag cache sizes.

The following examples are intended for purposes of illustration and not limitation. The tags listed in the examples may optionally contain extra status bits such as "dirty bit", or may be organized in multiple sets as discussed earlier.

| Example 1 | |
|---|---|
| Three Ports, each having: | |
| Tag Memory: | 512 × 6 SRAM (6 compare) |
| Cache Memory: | 2K × 32 SRAM |
| | cache line length = 4 × 32 bits |
| Main Memory: | 128K × 32 SRAM |
| Example 2 | |
| Port 1: | |
| Tag Memory: | 512 × 8 SRAM (8 compare) |
| Cache Memory: | 2K × 32 SRAM |
| | cache line length = 4 × 32 bits |
| Port 2: | |
| Tag Memory: | 2K × 6 SRAM (6 compare) |
| Cache Memory: | BK × 32 SRAM |
| | cache line length = 4 × 32 bits |
| Main Memory: | 512K × 32 SRAM |

Those of ordinary skill in the art will recognize that many modifications and variations of the present invention may be implemented. The foregoing description and the following claims are intended to cover all such modifications and variations.

What I claim is:

1. A method of emulating a dual-port memory device with a memory device having a single port main memory array and first and second cache memory arrays, said method comprising the following steps which are preformed internally of the memory device:

storing data entries in the main memory array;

storing multiple data entries which are the same as data entries stored in the main memory array in the first and second cache memory arrays, the first and second cache memory arrays being of different sizes;

mapping the multiple data entries stored in the first and second cache memory arrays to the main memory array;

generating a first ready signal in response to data entries stored in the first cache memory array;

generating a second ready signal in response to data entries stored in the second cache memory array; and controlling the movement of data entries into and out of the memory device in response to the first and second signals to enable a device having a single port main memory array to emulate a dual-port memory device having ports of different bandwidths.

2. The method of claim 1 wherein said step of generating the first ready signal includes the step of comparing a portion of an address with tag information in a first tag memory array and wherein said step of generating the second ready signal includes the step of comparing a portion of an address with tag information in a second tag memory array.

3. A method of enabling a device having a single port main memory array to emulate a device having a multi-port memory array comprising the following steps which are performed internally of the memory device:

storing data entries in the main memory array;

storing multiple data entries which are the same as data entries stored in the main memory array in a plurality of cache memory arrays, each of the cache memory arrays being of a different size;

mapping the information stored in the plurality of cache memory arrays to the main memory array;

generating a plurality of ready signals in response to information stored in the plurality of cache memory arrays; and controlling the movement of data entries out of the device in response to the plurality of signals to enable a device having a single port main memory array to emulate a multi-port memory device having ports of different bandwidths.

4. The method of claim 3 wherein said step of generating a plurality of ready signals includes the steps of comparing a portion of an address with tag information stored in a plurality of tag memory arrays.

5. The method of claim 3 wherein said step of controlling the movement of data entries includes the step of outputting data entries from one of the plurality of cache memory arrays and the main memory array.

6. A method of emulating a multi-port memory device using a single port main memory array comprising the following steps which are preformed internally of the device:

storing, in a plurality of cache memory arrays of different size, multiple data entries which are the same as data entries retrieved from a main memory array;

identifying which data entries are stored in the plurality of cache memory arrays; and simultaneously retrieving data entries from more than one of the cache memory arrays to enable a device having a single port main memory array to emulated a multi-port device wherein the ports have different bandwidths.

7. The method claim 6 wherein said identifying step includes the step of storing tag information in a plurality of tag memory arrays, said tag information corresponding to the data entries stored in the plurality of cache memory arrays.

8. The method of claim 7 wherein said step of simultaneously retrieving includes the steps of simultaneously comparing a plurality of address portions to tag information stored in the plurality of tag memory arrays.

9. The method of claim 6 wherein said step of simultaneously retrieving includes the step of retrieving a data entry from one of the plurality of cache memory arrays and the step of retrieving another data entry from the main memory array.

10. The method of claim 6 wherein said step of simultaneously retrieving includes the step of retrieving a data entry from one of the plurality of cache memory arrays and the step of retrieving another data entry from another of the plurality of cache memory arrays.

11. A method of operating a multi-port memory device having a single port main memory array to enable the device to emulate a device having a multi-port main memory array, said method being preformed internally of the device and comprising:

storing, in a plurality of cache memory arrays of different sizes, multiple data entries which are the same as data entries retrieved from the main memory array;

storing tag information in a plurality of tag memory arrays, the tag information corresponding to the data entries stored in the plurality of cache memory arrays;

simultaneously receiving address information corresponding to more than one data entry; and outputting from the device data entries corresponding to the received address information in a manner such that an average access time of the memory device is different for each port and less than an average access time of the single port memory array.

12. The method of claim 11 wherein said outputting step includes the steps of comparing at least a portion of the received address information to the tag information, and retrieving data entries for output according to the results of said comparing step.

13. The method of claim 12 wherein said step of retrieving data entries includes the step of retrieving a data entry from one of the plurality of cache memory arrays and the step of retrieving at least one other data entry from at least one other of the plurality of cache memory arrays.

14. The method of claim 12 wherein said step of retrieving data entries includes the step of retrieving a data entry from at least one of the plurality of cache memory arrays and the step of retrieving another data entry from the main memory array.

15. A method of operating a multi-port memory device having a single port main memory array, said method performed internally of said device and comprising:

provinding a plurality of cache memory arrays, at least two being of a different size, and the total number of cache memory arrays being equal to the number of ports of the multi-port memory device, and providing a plurality of tag memory arrays, one responsive to each of the cache memory arrays;

simultaneously receiving address information at more than one port of the device, said address information corresponding to data entries; and simultaneously outputting data entries from the device corresponding to the received address information to enable a device having a single port main memory array to emulate a multi-port memory device having at least two ports of different bandwidth.

16. The method of claim 15 wherein said outputting step includes the steps of comparing at least a portion of the received address information to tag information stored in the tag memory arrays and corresponding to the data entries stored in the associated cache memory array, and retrieving data entries for output according to the results of said comparison step.

17. The method of claim 16 wherein said step of retrieving data entries includes the step of retrieving a data entry from one of the plurality of cache memory arrays and the step of retrieving at least one other data entry from at least one other of the plurality of cache memory arrays.

18. The method of claim 16 wherein said step of retrieving data entries includes the step of retrieving a data entry from at least one of the plurality of cache memory arrays and the step of retrieving another data entry from the main memory array.

19. A method of operating a multi-port memory device having a single port main memory array, said method performed internally of said device and comprising:

providing a plurality of variously sized cache memory arrays equal in number to the number of ports, and providing a plurality of tag memory arrays, one tag memory array being associated with each of the cache memory arrays;

receiving address information at more than one port of the device, said address information corresponding to data entries; and outputting data entries from the device corresponding to the received address information on the port at which the address information was received in a manner such that an average access time of the memory device is different for at least two ports and less than an average access time of the single port memory array.

20. The method of claim 19 wherein said outputting step includes the steps of comparing at least a portion of the received address information to tag information stored in the tag memory arrays and corresponding to the data entries stored in the associated cache memory array, and retrieving data entries for output according to the results of said comparison step.

21. The method of claim 20 wherein said step of retrieving data entries includes the step of retrieving a data entry from one of the plurality of cache memory arrays and the step of retrieving at least one other data entry from at least one other of the plurality of cache memory arrays.

22. The method of claim 20 wherein said step of retrieving data entries includes the step of retrieving a data entry from at least one of the plurality of cache memory arrays and the step of retrieving another data entry from the main memory array.

* * * * *

UNITED STATES PATENT AND TRADEMARK OFFICE
CERTIFICATE OF CORRECTION

PATENT NO. : 6,189,073 B1
DATED : February 13, 2001
INVENTOR(S) : Pawlowski

Page 1 of 1

It is certified that error appears in the above-identified patent and that said Letters Patent is hereby corrected as shown below:

Column 7,
Example 2, Port 2, delete "Cache Memory BK x 32 SRAM" insert -- "Cache Memory 8K x 32 SRAM" --

Signed and Sealed this

Fifth Day of March, 2002

Attest:

JAMES E. ROGAN
*Attesting Officer*       *Director of the United States Patent and Trademark Office*